Figure 1:
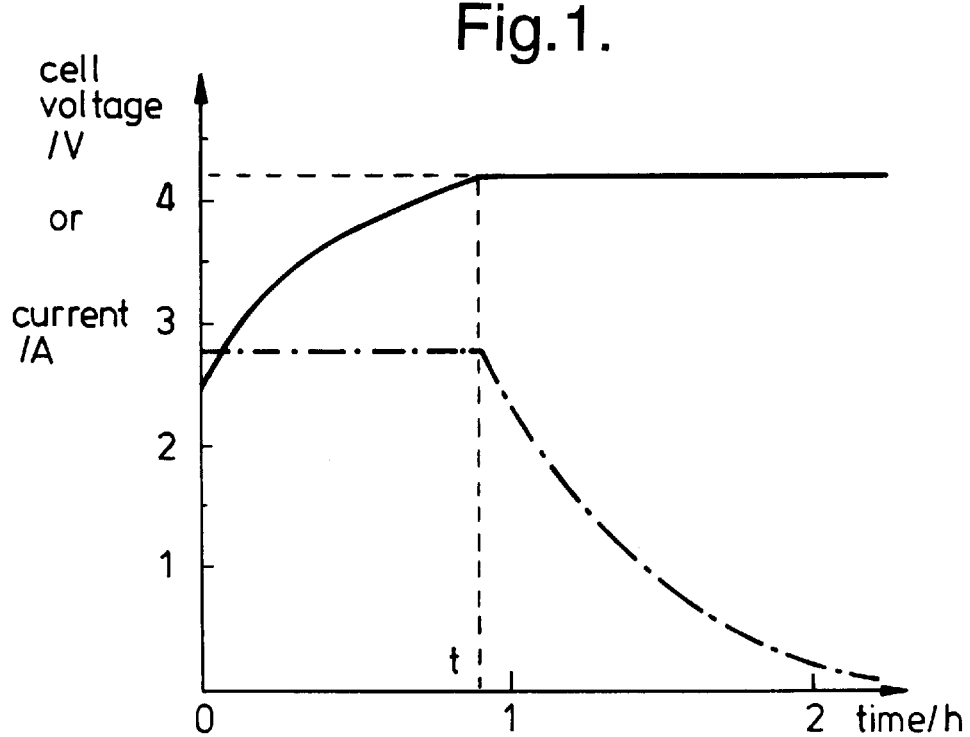

United States Patent
Stephenson et al.

[11] Patent Number: 5,897,973
[45] Date of Patent: Apr. 27, 1999

[54] LITHIUM CELL RECHARGING

[75] Inventors: Andrew David Hamilton Stephenson, Steventon; Sean Francis Palmore, Newbury, both of United Kingdom

[73] Assignee: AEA Technology, Ora, United Kingdom

[21] Appl. No.: 08/811,637

[22] Filed: Mar. 5, 1997

[30] Foreign Application Priority Data

Mar. 20, 1996 [GB] United Kingdom ............... 9605830

[51] Int. Cl.$^6$ ............................................. H01M 10/44
[52] U.S. Cl. ............................ 429/50; 429/61; 320/162
[58] Field of Search ........................... 429/7, 50, 61; 320/162

[56] References Cited

U.S. PATENT DOCUMENTS

| | | | |
|---|---|---|---|
| 4,238,721 | 12/1980 | DeLuca et al. | 320/18 |
| 4,869,975 | 9/1989 | Eppley et al. | 429/50 X |
| 4,935,315 | 6/1990 | Herrin | 429/50 |
| 5,119,009 | 6/1992 | McCaleb et al. | 429/50 X |
| 5,283,512 | 2/1994 | Stadnick et al. | 320/18 |
| 5,307,000 | 4/1994 | Podrazhansky et al. | 320/14 |
| 5,387,857 | 2/1995 | Honda et al. | 320/18 |
| 5,637,413 | 6/1997 | Fernandez et al. | 429/7 |

FOREIGN PATENT DOCUMENTS

| | | |
|---|---|---|
| 0 498 679 | 8/1992 | European Pat. Off. . |
| 0 498 679 A2 | 8/1992 | European Pat. Off. . |
| 0 729 185 A2 | 8/1996 | European Pat. Off. . |
| 2 293 060 | 3/1996 | United Kingdom . |
| WO 84/01675 | 4/1984 | WIPO . |
| WO 92/06525 | 4/1992 | WIPO . |
| WO 95 15604 | 6/1995 | WIPO . |
| WO 95/15023 | 6/1995 | WIPO . |
| WO 96 17397 | 6/1996 | WIPO . |

Primary Examiner—Stephen Kalafut
Attorney, Agent, or Firm—Larson & Taylor

[57] ABSTRACT

Excessive charging of the weaker cells in a battery of lithium cells, during potentiostatic charging, is prevented by providing each cell (S) with a bypass circuit (12) including a MOSFET (T). An integrated circuit (Y) monitors the cell voltage, and if the design voltage of the cell (S) is exceeded the circuit (Y) provides a signal to the gate of the MOSFET (T) so that part of the charging current (I) bypasses that cell (S), while most of the charging current flows through the cell (S). The bypass current flows only while each of the other cells in the battery are coming up to the design voltage, so that little power is dissipated in the bypass circuit (12). If the cells are balanced, so they accept charge equally, then the bypass circuit never carries current; if the cells are not balanced, they will be brought near to balance over a few charge/discharge cycles.

3 Claims, 1 Drawing Sheet

LITHIUM CELL RECHARGING

This invention relates to a circuit and a method for charging rechargeable lithium cells in a battery.

The circuit is particularly though not exclusively suitable for use with lithium ion rechargeable cells. Such a cell uses intercalation materials such as $LiCoO_2$ as the active cathode material, and graphite as the active anode material, with an organic electrolyte between them. The design voltage of such a cell depends upon the materials of the cell, and if it is charged above that design voltage this is referred to as overcharging. Various deleterious phenomena may occur as a result of overcharge, for example deposition of lithium metal on the anode, decomposition of the cathode material, and decomposition of the organic electrolyte. To maximise the life of such cells it is therefore desirable to suppress overcharging. This is especially the case where a battery comprising a plurality of such cells in series is to be charged, as the weakest cell (of lowest capacity) will be the first to be charged, and hence will tend to be overcharged, so becoming weaker still. One circuit for preventing overcharge is described in EP 0 525 744 A (Sony) in which the voltage of each cell is monitored, and if the voltage of one cell exceeds an overcharge threshold the charging current to the battery is switched off while that cell is discharged through a resistor. Recharging of the battery recommences when the voltage of that cell drops to a lower threshold.

SUMMARY OF THE INVENTION

According to the present invention there is provided a method of recharging a rechargeable lithium cell in a battery of lithium cells in series, the method comprising recharging the battery at a constant voltage with a current limit, detecting the voltage across each cell while the recharging current is flowing, and if the detected voltage exceeds a threshold value causing a part of the recharging current to bypass the cell while the major part of the recharging current flows through the cell.

By recharging at a constant voltage with a current limit is meant that the applied voltage is set at the design voltage of each cell multiplied by the number of cells in series. However, when the recharging process commences the cell emfs may be so low that the charging voltage will be less than this nominal applied voltage, as the charging current will not be permitted to exceed a standard value, typically, the C rate for the cells (i.e. that current (in amps) which is numerically equal to the capacity of the cell in amp hours).

The preferred bypass circuit comprises a MOSFET, preferably in series with a resistor, the gate of the MOSFET being controlled by a signal from the voltage detector means. Preferably the control signal is smoothed before it is supplied to the gate. Typically the bypass current is between about 10 mA and 200 mA, and is no more than 10% of the charging current.

The invention will now be further and more particularly described by way of example only and with reference to the accompanying drawings in which:

BRIEF DESCRIPTION OF TE DRAWINGS

Figure 2:
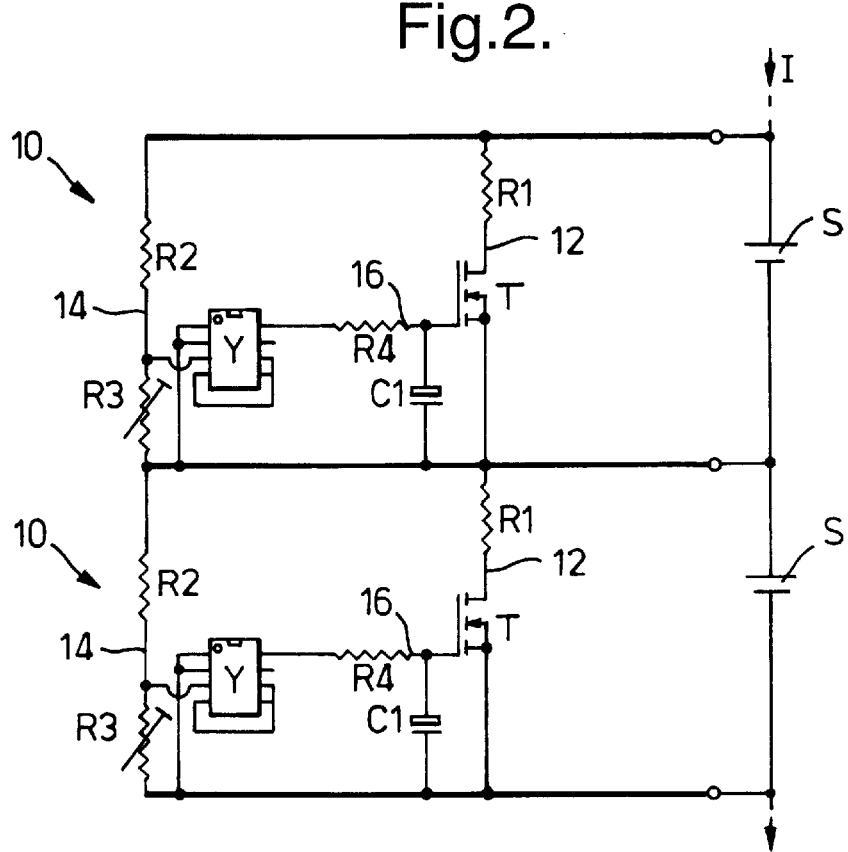

FIG. 1 shows graphically the variations of current and cell voltage with time during charging of a single cell; and FIG. 2 shows a circuit diagram for an overcharge prevention circuit.

Referring to FIG. 1 there is shown graphically the variations of cell voltage (solid line) and current (chain dotted line) during charging, for a single lithium ion cell with $LiCoO_2$ as the active cathode material and graphite as the active anode material. The design voltage of this cell is 4.2 V, and the capacity (measured with a 5 hour discharge) is 2.7 Ah so that the C rate is 2.7 A. The charger is set to provide a voltage of 4.2 V, and the current must not exceed 2.7 A. During the initial stage of charging the charge current is the constraining factor (up to time t), while in the later stage the voltage is held constant at 4.2 V and the current gradually decreases. Charging a cell in this manner is referred to as charging at a constant voltage with a current limit. The graphs for other cells of the same design and nominal capacity would be similar, but in practice there will usually be some differences in capacity between cells which are nominally identical, and this will be evident from small differences in the time t taken to reach the design voltage.

If a plurality of such nominally identical cells, say two, are arranged as a battery in series, and charged in this way, with a charger set to provide a total voltage equal to 4.2 V times the number of cells, then there will be a period of time during the charging operation when the weaker cell (of slightly lesser capacity) has reached the design voltage, whereas the stronger cell (of slightly higher capacity) is still below the design voltage. If charging is continued then the voltage across the weaker cell will exceed the design voltage, and the weaker cell will experience overcharging and a consequent reduction in capacity.

Referring now to FIG. 2 there is shown an overcharge suppression circuit for the cells S of a battery. The battery may have any number N of cells S, but only two cells S are shown in the diagram, and each cell S has a respective suppression circuit 10 connected across its terminals; only two circuits 10 are shown. The cells S, which are of the type described in relation to FIG. 1, are connected in series with each other and are connected to a charger (not shown) which provides a charging current I, and which operates at a constant voltage with a current limit: initially the charge current I is held at the maximum acceptable value of 2.7 A (i.e. the C rate), and the charger voltage is set to be just less than N×4.2 V at maximum.

Each circuit 10 comprises a bypass circuit 12 consisting of a MOSFET T in series with a resistor R1 connected between the terminals of the cell S. A potential divider 14, consisting of a resistor R2 and an adjustable resistor R3 in series, is also connected between the terminals of the cell S, and the midpoint of the potential divider 14 provides an input to an integrated circuit Y. The integrated circuit Y compares the input voltage to an internal reference potential (of 1.8 V), and gives an output signal to the gate of the MOSFET T via a smoothing filter 16 comprising a resistor R4 and a capacitor C1.

In this example the MOSFET T is of the type RFD16N06LE, and the resistor R1 is 18 Ω, 2.5 W. Unless a signal is provided to the gate, no current flows through the bypass circuit 12. The resistors R2 and R3 are 4.7 MΩ and 2.2 MΩ respectively so the potential divider 14 draws less than 1 μA; the resistor R3 is adjusted so that if the cell voltage is 4.2 V the input voltage provided to the integrated circuit Y is equal to its internal reference potential. The integrated circuit Y is of the type MAX 921, and provides a signal to the gate of the MOSFET T to turn the MOSFET on whenever the input voltage exceeds the internal reference potential, i.e. whenever the cell voltage exceeds 4.2 V. In the smoothing filter 16, resistor R4 is 100 kΩ, and the capacitor C1 is a 2.2 μF tantalum electrolytic capacitor.

Consequently when the voltage across a cell S starts to exceed 4.2 V the integrated circuit Y provides a signal to the gate of the MOSFET T, so a current of a few tens of milliamps flows through the bypass circuit 12. This is sufficient to prevent 4.2 V being exceeded. The output signal from the integrated circuit Y is in fact a square wave of varying mark/space ratio, because whenever the MOSFET T opens, the cell voltage drops back to 4.2 V, so the circuit Y reverts to no output signal. The effect of the smoothing circuit 16 is that the average current through the bypass circuit 12 is just that required to hold the voltage of that cell S at 4.2 V.

Meanwhile the other cells S in the battery continue to receive the full charging current I, so that after a few minutes all the cells S have reached the design voltage of 4.2 V. At this point the total charging voltage is shared equally across all the cells S, so none of the cells tend to exceed 4.2 V, and so the bypass currents for all the cells S become zero. Thus this circuit ensures that no cell S is excessively overcharged; and passes a small bypass current only during the time after a cell S has reached 4.2 V while other, higher capacity cells S are reaching 4.2 V, so that there is little power dissipation in the bypass circuits 12. Thus premature failure of the weakest cell or cells in the battery is prevented, and little power is wasted in heat dissipation. The circuits 10 draw very little current, so they can remain connected to the cells S at all times, or alternatively they may be disconnected when recharging has been completed.

It will be understood that the overcharge suppression circuit 10 may not totally prevent the weakest cell from slightly exceeding the threshold voltage of 4.2 V, but it does reduce the total charge received by that cell as compared to the other cells. After several charge/discharge cycles the cells will tend to become balanced, so their capacities are substantially equal. However, if one of the cells is of much less capacity than the other then the circuit 10 will not be able to prevent the cell voltage from rising above 4.2 V; typically other protection devices (not shown) would stop the charging process if any of the cells reached as much as say 4.35 V.

It will be appreciated that an overcharge suppression circuit can differ in various ways from that described above while remaining within the scope of the invention. It will be understood that different values of resistor and capacitor may be used, that a different type of MOSFET may be used, and a different model of integrated circuit. And it is evident that for charging cells which have a different design voltage, the circuit 10 will have to be modified so that the bypass circuits 12 start to allow a current to flow at this different voltage.

We claim:

1. A method of recharging a rechargeable battery comprising a plurality of lithium cells in series, said cells having a design voltage and the method comprising recharging the battery at a constant voltage with a current limit, detecting the voltage across each cell while the recharging current is flowing, and if the detected voltage across any cell exceeds a threshold value causing a part of the recharging current to bypass that cell, wherein at all stages during recharging at least the major part of the recharging current flows through that cell, and wherein the recharging is terminated when the voltage across the battery reaches a value equal to the design voltage of a cell multiplied by the number of said plurality of cells, said bypass circuit comprising a MOSFET, the MOSFET having a gate which is controlled by a signal generated in response to the detected voltage exceeding said threshold value, and the control signal being smoothed before being supplied to the gate.

2. A method as claimed in claim 1 wherein the bypass current is between 10 mA and 200 mA.

3. A method as claimed in claim 1 wherein the bypass current is no more than 10% of the recharging current.

\* \* \* \* \*